(12) United States Patent
Keller

(10) Patent No.: US 7,021,665 B2
(45) Date of Patent: Apr. 4, 2006

(54) MUD FLAP SAVER APPARATUS

(76) Inventor: Brian J. Keller, 6975 Gilbert Rd., Ubly, MI (US) 48475

( * ) Notice: Subject to any disclaimer, the term of this patent is extended or adjusted under 35 U.S.C. 154(b) by 255 days.

(21) Appl. No.: 10/303,235

(22) Filed: Nov. 25, 2002

(65) Prior Publication Data

US 2003/0098577 A1 May 29, 2003

Related U.S. Application Data

(60) Provisional application No. 60/334,263, filed on Nov. 29, 2001.

(51) Int. Cl.
*B62D 25/18* (2006.01)

(52) U.S. Cl. .................. 280/848; 280/851; 280/154

(58) Field of Classification Search ............ 280/847, 280/848, 851, 154; 293/112; 296/198; 298/1 SG, 298/17 R See application file for complete search history.

(56) References Cited

U.S. PATENT DOCUMENTS

| | | | |
|---|---|---|---|
| 2,414,676 A | 1/1947 | Taurman | 280/160 |
| 2,721,760 A | 10/1955 | Lapham et al. | 298/1 |
| 2,857,200 A * | 10/1958 | Gustav | 298/1 SG |
| 3,165,360 A | 1/1965 | Saxton et al. | 298/1 |
| 3,248,126 A * | 4/1966 | Saxton et al. | 280/851 |
| 3,486,764 A * | 12/1969 | Beyer et al. | 280/851 |
| 3,507,513 A * | 4/1970 | Bohrer | 280/851 |
| 3,582,109 A | 6/1971 | Moore | 280/154.5 |
| 3,700,260 A | 10/1972 | Moore et al. | 280/154.5 |
| 3,806,196 A * | 4/1974 | Cole et al. | 298/1 SG |
| 3,806,197 A * | 4/1974 | Knszek et al. | 298/1 SG |
| 3,837,672 A | 9/1974 | Molby | 280/154.5 |
| 3,905,616 A | 9/1975 | Tamburino et al. | 280/154.5 |
| 4,097,090 A * | 6/1978 | Payne et al. | 298/1 SG |
| 4,113,269 A | 9/1978 | Richardson et al. | 280/154.5 |
| 4,221,432 A | 9/1980 | VanRemortel et al. | 298/1 |
| 4,271,401 A * | 6/1981 | Meo | 340/431 |
| 5,199,742 A | 4/1993 | Götz et al. | 280/851 |
| 5,570,756 A * | 11/1996 | Hatcher | 180/287 |
| 5,582,431 A | 12/1996 | Anderson | 280/851 |
| 5,676,389 A | 10/1997 | Richardson | 280/149.2 |
| 6,139,062 A | 10/2000 | Meyer | 280/851 |
| 6,158,775 A | 12/2000 | Nickels | 280/847 |
| 6,402,200 B1 * | 6/2002 | Myers | 280/851 |
| 6,623,038 B1 * | 9/2003 | Heem | 280/848 |
| 6,799,808 B1 * | 10/2004 | Walters | 298/1 SG |
| 2002/0074790 A1 | 6/2002 | Heem | 28/851 |

FOREIGN PATENT DOCUMENTS

| | | | |
|---|---|---|---|
| SU | 1518163 | 10/1989 | 280/851 |

* cited by examiner

*Primary Examiner*—Christopher P. Ellis
*Assistant Examiner*—Bridget Avery
(74) *Attorney, Agent, or Firm*—Howard & Howard

(57) ABSTRACT

A box for handling materials with a vehicle and a mud flap lifter apparatus positioned in it includes a box, generally indicated at having front and rear corners and front, rear and side walls, and a sleeve extending between the top and bottom of the adjacent side-walls. At least one mud flap is secured under the rear wall of the box frame and at least one lifting unit connected with the mud flap. The lifting unit extends vertically within the sleeve and is connected to the mud flap for raising and lowering the mud flap. In one of several alternative embodiments, a solenoid valve is added to convert electric power to activate the air delivery to outward and inward pressure airlines and to distribute the air supply between the outward and inward pressure airlines, respectively.

15 Claims, 3 Drawing Sheets

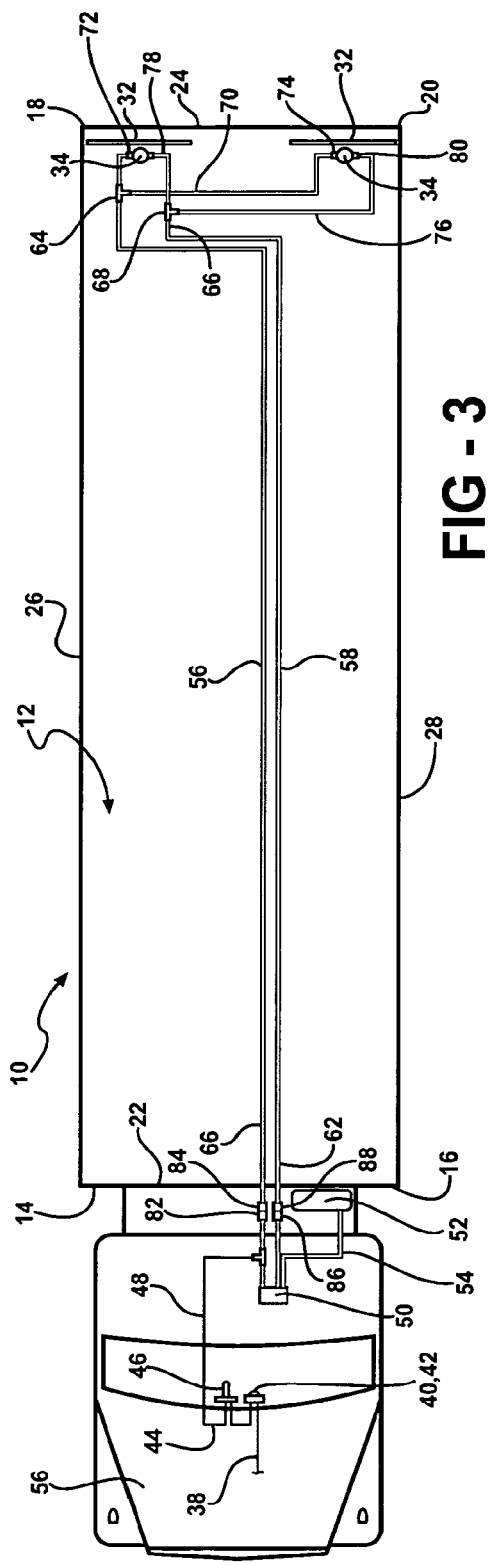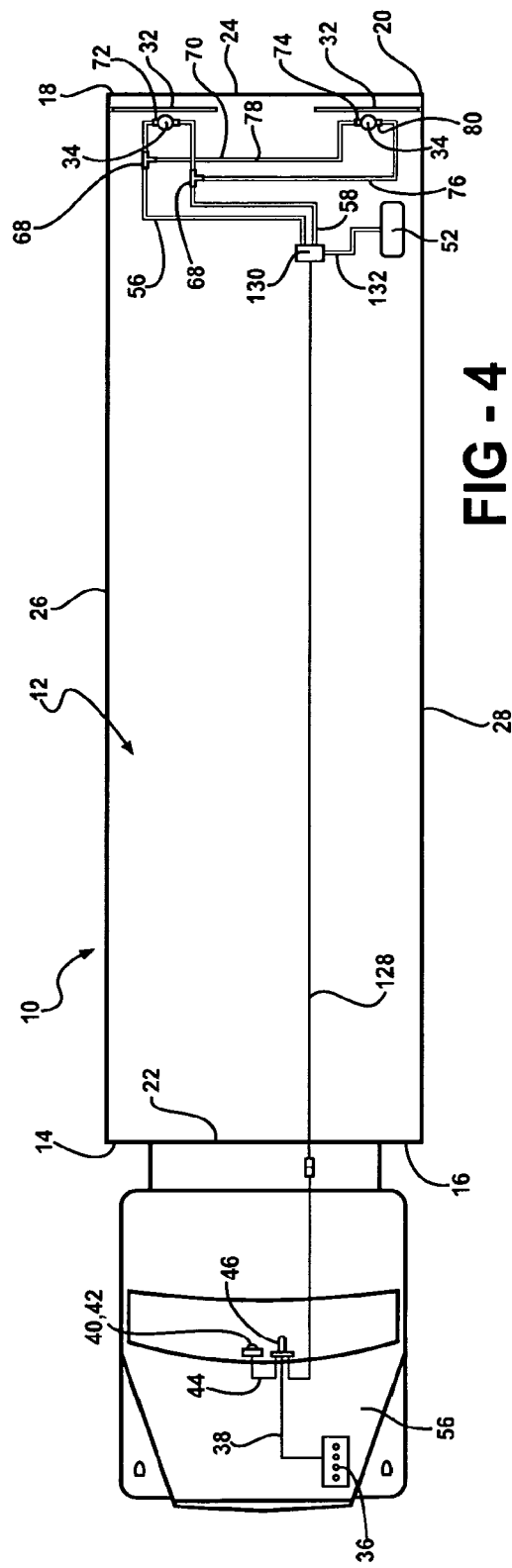

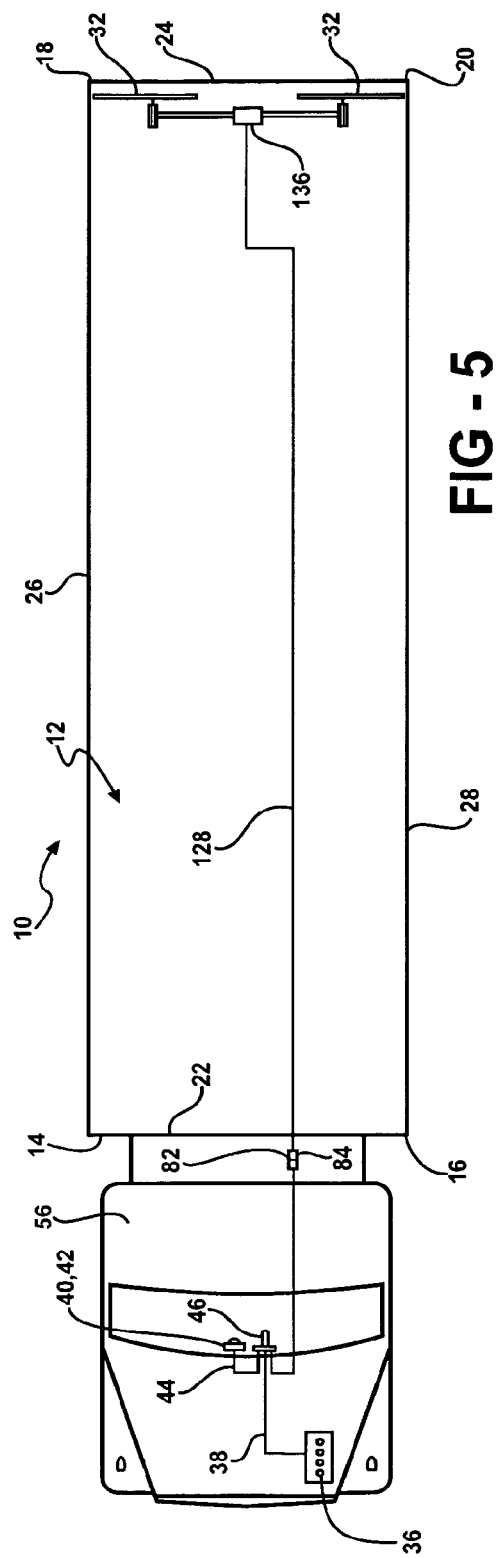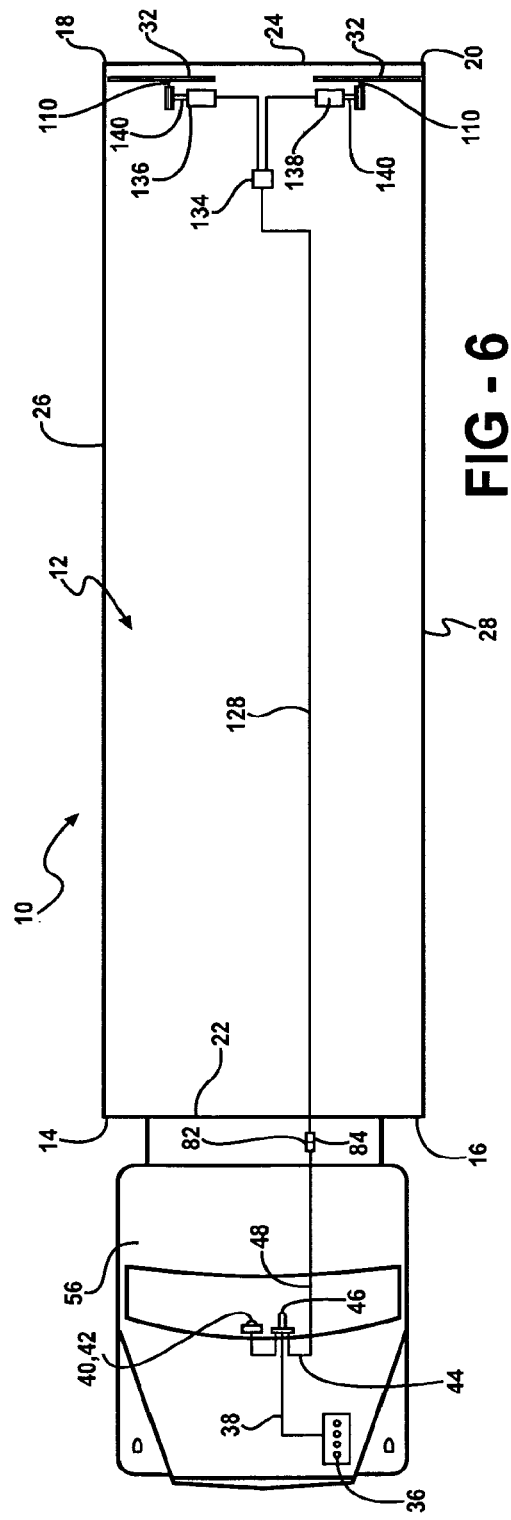

MUD FLAP SAVER APPARATUS

This application claims benefit to Provisional appl. No. 60/334,263, filed Nov. 29, 2001.

BACKGROUND OF THE INVENTION

1. Field of the Invention

The subject invention relates generally to a mud flap lifters, which adjust the position of the mud flaps in order to prevent the mud flaps from being torn or otherwise damaged, and more particularly to the positioning of the lifting units on the vehicle.

2. Description of the Prior Art

Mud flaps, made of rubber, are generally installed behind rear wheels on trailers, trucks and other heavy vehicles that operate on public roadways. The mud flaps are necessary to prevent water, mud, and other debris from splashing onto vehicles travelling behind the heavy vehicle, and are known to get trapped beneath the tires and get torn off and broken, or otherwise damaged when the vehicle moves in reverse. To prevent this type of damage the mud flaps were temporarily fastened to the truck rearward and away from the rear wheels. To do so, the driver had to stop the truck, leave the cabin, and manually raise the mud flap. Manually moving a mud flap while outside the cabin was very inconvenient, time consuming and dangerous, especially in a construction zone during heavy traffic.

Today, vehicle manufacturers do not equip heavy vehicles with mud flap savers that could solve number of problems. In addition to lost time replacing or fixing a damaged mud flap, purchasing new mud flaps, heavy vehicle without mud flaps are known to create an accidents by splashing dirty water, mud, and other debris onto vehicles travelling behind the heavy vehicle on public roadways Numerous mud flap lifters are known in the prior and widely used today in the industry, tried to solve this problem. U.S. Pat. No. 6,158,775 to Nickels, U.S. Pat. No. 6,402,200 to Myers, and United States Patent Publication No. 2002/0074790 to Heem disclose a variety of mud flap systems and assemblies.

The U.S. Pat. No. 6,158,775 to Nickels shows a mud flap lifting device provided for mounting on a truck or other vehicles in which the device selectively lifts the mud flap away from the tires. The device includes a power cylinder or lifting unit mounted to the vehicle in proximity to an upper edge of the mud flap wherein the cylinder includes a movable piston. The power cylinder is mounted in a housing positioned below and outside rear end of the vehicle and can be damaged by debris or by another vehicle during collision or when backing up.

The U.S. Pat. No. 6,402,200 to Myers describes an apparatus and method for moving the mud flaps mounted on a truck from their normal planar operating position behind the truck's rear tires to a protected position engaging the rear tires. The apparatus includes a power cylinder to manipulate the mud flaps wherein the power cylinder is positioned on the side-walls of the truck above the tires.

The U.S. Patent Publication No. 2002/0074790 to Heem shows an automatic lifting mud flap assembly for a motor vehicle that includes at least two identical flap control boxes or housings wherein each housing is detachably mounted on the motor vehicle in the location of the mud flap after the standard mud flap is removed. The mud flap is then mounted on the mounting box using standardized fittings. The housing includes a lifting unit and a pulley system positioned within the housing to control the extent of the cable outside the box, connected with the mud flaps. Similar to mud flap lifting devise disclosed in the U.S. Pat. No. 6,158,775 to Nickels, the lifting unit disclosed in the U.S. Patent Publication No. 2002/0074790 to Heem can be damaged by another vehicle during collision or when backing up.

Although the prior art patents provide different designs of the mud flap lifters, one of the opportunities of continuous development and research is the area of a more advanced design of a mud flap lifters are protected from environmental damage. It would be desirable to conceal a mud flap lifting unit on a vehicle protecting from damage by another vehicle during the collision or when backing up.

BRIEF SUMMARY OF INVENTION

The present invention includes a box for handling materials with a vehicle and a mud flap lifter apparatus positioned within the box that comprises a box frame having front and rear corners and front, rear and side walls wherein the side walls have tops and bottoms. Each of the front and rear corners includes a vertical sleeve positioned at each of the corners and extending between the top and bottom of the adjacent side walls. The invention includes at least one mud flap secured under the rear wall of the box frame and at least one lifting unit connected with the mud flap. The invention is characterized by the lifting unit extending within the sleeve and connected to the mud flap for raising and lowering the mud flap.

It is therefore an object of the present invention to provide a mud flap saver apparatus capable of remotely lifting the mud flaps in order to prevent the mud flaps from being trapped beneath the wheels while moving the heavy vehicle in reverse. Accordingly, the mud flap lifters apparatus of the present invention is efficient and provides for the lifting units being isolated within the box frame of the vehicle and provides for protection of the lifting units from damage by another vehicle during the collision or when backing up.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a schematic view of the mud flap lifting system as taken from top of the vehicle.

FIG. 4 is a is a schematic view of an alternative embodiment of the mud flap lifting system as taken from top of the vehicle;

FIG. 5 is a schematic view of another alternative embodiment of the mud flap lifting system as taken from top of the vehicle; and FIG. 6 is a schematic view of still another alternative embodiment of the mud flap lifting system as taken from top of the vehicle.

DETAILED DESCRIPTION OF THE INVENTION

Figure 1:
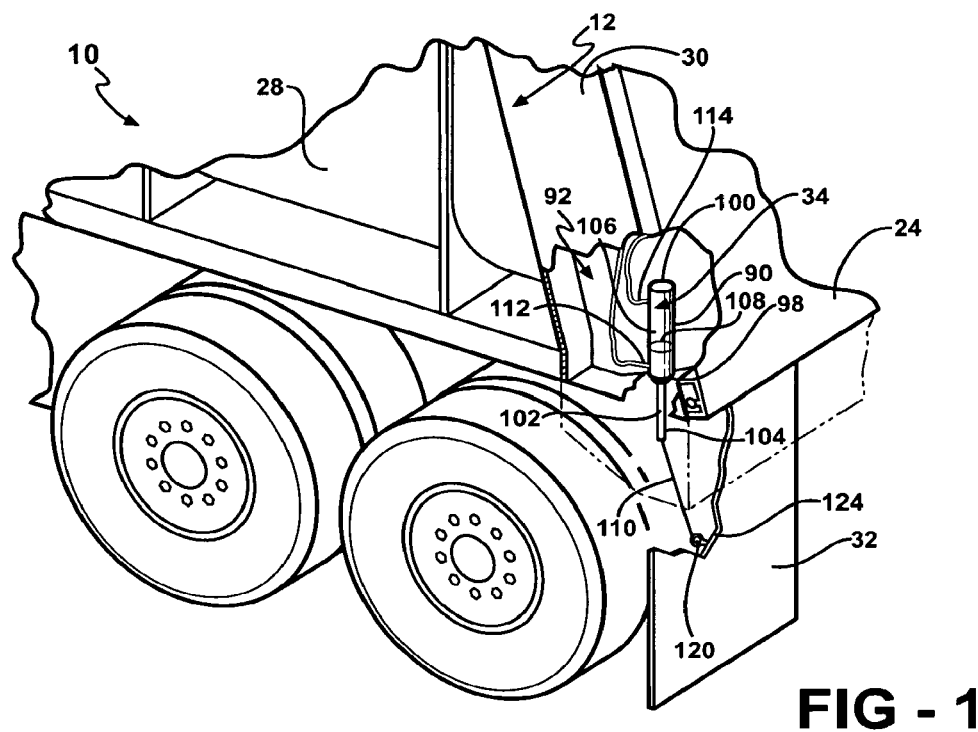
FIG. 1 is a perspective view of a box frame showing a lifting unit positioned within a sleeve in a first mode of operation.
Figure 2:
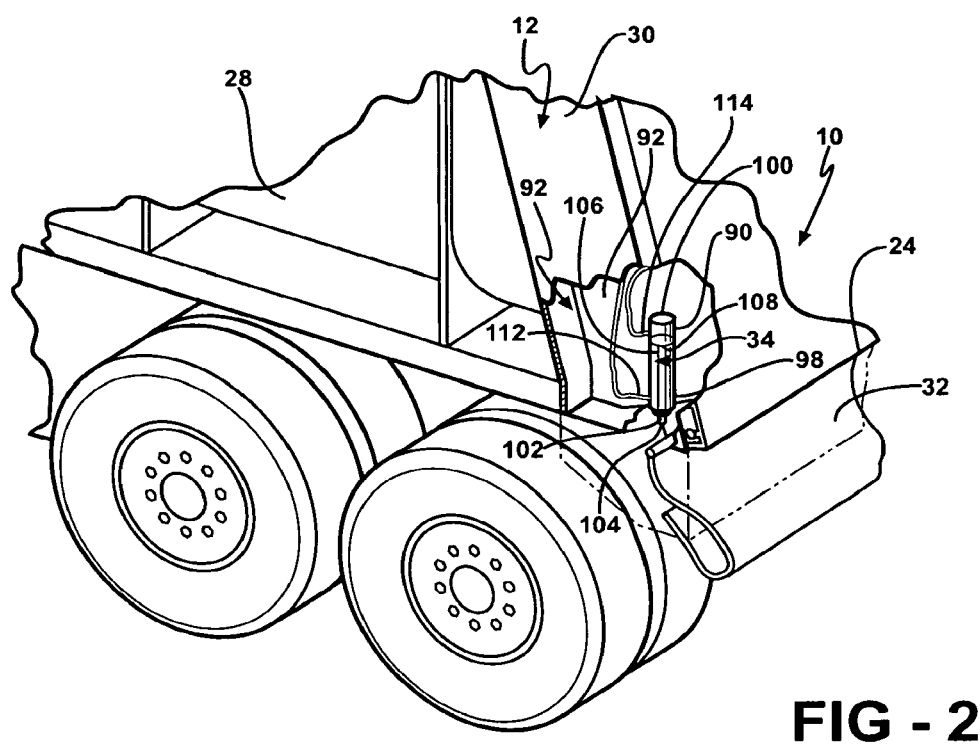
FIG. 2 is a perspective view of the box frame showing the lifting unit positioned within the sleeve in a second mode of operation.

Referring to the FIGS. 1 through 6, wherein like numerals indicate like or corresponding part throughout the several views, a box for handling materials with a vehicle and a mud flap lifter apparatus, is generally shown at 10. The present invention includes a box, generally indicated at 12, having front 14, 16 and rear 18, 20 corners and front 22, rear 24 and side 26, 28 walls defining a space between the walls 22, 24, 26, 28. The side-walls 26, 28 have tops and bottoms to define the box 12. A vertical sleeve 30 is positioned at each of the front 14, 16 and rear 18, 20 corners extending between the top and bottom of the adjacent side-walls 26, 28. At least one mud flap 32 is secured under the rear wall 24 of the box frame 12 and at least one lifting unit, generally indicated at 34 connected with the mud flap 32. The lifting unit 34 extends vertically within the sleeve 30 and connects to the mud flap 32 for raising and lowering the mud flap 32, as shown in FIGS. 1 and 2. In the alternative embodiment of the present invention, the lifting unit 34 may be disposed horizontally within the sleeve 30 and connected to the mud flap 32 for raising and lowering the mud flap 32.

As shown in FIGS. 4–6, a power source 36 is positioned in the vehicle to supply electric power to the entire system. Preferably, the power source 36 includes a battery (not shown). The power source 36 includes an electric wire 38 connecting with a noise indicator 40 position in the vehicle to inform the driver when the mud flaps 32 are raised. In the alternative embodiment of the present invention, the noise indicator 40 may be substituted with a light indicator 42 positioned in the vehicle and connected with the power source 36 to receive electric power to activate the light indicator 42. An electric wire 44 connects the indicator 42 with a brake pressure switch 46 comprising at least one cable 48 extending therefrom.

A multi-mode activator 50 is adjacent the brake pressure switch 46 to regulate an air supply into respective mode of operation of the mud flaps 32 during lifting and lowering the mud flaps 32. The air supply is provided by at least one air tank 52 that includes at least one airline 54 extending from the air tank 52 and connected with the multi-mode activator 50 to supply air from the air tank 52 to the multi-miode activator 50.

Preferably, the multi-mode activator 50 includes a three way, four port valve block operatively connected with the air tank 52. The multi-mode activator 50 utilizes an air adjuster (not shown) to regulate the amount of air emitted from the air tank 52.

The multi-mode activator 50 is operated from within a cabin 56 to lower and raise the mud flaps 32. The multi-mode activator 50 includes a knob (not shown). By actuating the knob in one direction, the multi-mode activator 50 generates and supplies airlines with an inward pressure to lift the mud flaps 32. In addition, when actuating the knob in a second direction, the multi-mode activator 50 supplies the airlines with an outward pressure to release the mud flaps.

The airlines of the present invention extend outwardly from the multi-mode activator 50 towards the rear wall 24 of the box frame 12, and consist of outward 56 and inward 58 pressure airlines adjacent and spaced from one another. The outward 56 and inward 58 pressure airlines define front 60, 62 and rear 64, 66 ends, respectively. Each of the outward 56 and inward 58 pressure airlines comprises a T-shaped coupling 68 at the rear ends 64, 66. The inward pressure airline 58 includes an inward pressure fitting 70 that further defines first 72 and second 74 ends wherein the inward pressure fitting 70 is securably connected with the inward pressure airline 58 through the T-shaped coupling 68 that splits the inward pneumatic signal between the lifting units 34 to lift the mud flaps 32. Similarly, the outward pressure airline 56 includes an outward pressure fitting 76 that further defines first 78 and second 80 ends wherein the outward pressure fitting 76 is securably connected with the outward pressure airline 56 through the T-shaped coupling 68 splitting the outward pneumatic signal between the lifting units 34 to release the mud flaps 32.

In the alternative embodiment of the present invention the outward pressure airline 56 includes male/female engagement receptacles 82, 84, as shown in FIGS. 3 and 4, to couple the outward pressure airline 56 to the multi-mode activator 50, if the invention is used on a trailer. In addition, the inward pressure airline 58 includes male/female engagement receptacles 86, 88 to couple the inward pressure airline 58 to the multi-mode activator 50. Any type of the receptacles may be used to prevent the escape of pneumatic pressure from between the inward 58 and outward 56 pressure airlines as known to those of skill in the art of pneumatics will suffice.

Referring to FIGS. 1 and 2, the lifting unit 34 of the present invention includes a tubular housing 90 positioned in an enclosure, generally indicated at 92. A rod 102 is slidably disposed within the tubular housing 90. The rod 102 includes a distal end 104 extending downwardly from the housing 90. A piston 108 is affixed to a proximal end 106 of the rod 102 and is slidably disposed within the housing 90. A cable 110 is connected with the distal end 104 of the rod 102 and outwardly extending therefrom wherein the cable 110 is secured with a mud flap 32 at an opposite end to lift and lower the mud flap 32.

The tubular housing 90 includes inlet port 112, positioned on one side of the piston 108 of the housing 90, and outlet port 114 positioned at the other side of the piston 108 of the housing 90. As appreciated by those skilled in art, the inward pressure fitting 70, attached to the housings 90 at the respective outward ports 114, distributes the pneumatic signal between the lifting units 34 to release the mud flaps 32. The outward pressure fitting 76, attached to the housings 90 at the respective inward ports 112, distributes the pneumatic signal between the lifting units 34 to lift the mud flaps 32.

The rod 102 extending from the housing 90 is attached to a lifter 120 by a cable 110. A pin 124 is disposed upon an end of the lifter 120 opposite the cable 110 and is inserted through the mud flap 32 fixedly attaching the lifter 120 to the mud flap 32. The pin 124, however, can be removed from the mud flap 32 to repair or replace the mud flap 32 as desired. In the alternative embodiment of the present invention, (not shown), the cable 110, inserted through the mud flap 124, defines a small loop, secured by a ziptie. Alternatively, two lifters 120 may be fixedly attached to each mud flap 32 with two pins (not shown), each being operatively connected to the mud flap 32.

An alternative embodiment of the present invention, as illustrated in FIG. 4, includes an electric wire 128 extending outwardly from the brake pressure switch 46. The electric wire 128 is connected with a solenoid valve 130 that supplies the solenoid valve 130 with electric power to activate the air delivery to the outward 56 and inward 58 pressure airlines. The solenoid valve 130 is further connected with the air tank 52 by an air line 132 for receiving and distributing the air supply to the outward 56 and inward 58 pressure airlines, respectively.

In another alternative embodiment of the present invention, as illustrated in FIG. 6, the invention includes a junction box 134 connected with the electric wire 128 to receive the electric power from the power source. The junction box 134 distributes electric power to electric motors 136, 138 connected to the junction box 134 by an electric wire 140. The motors 136, 138 are activated by the electric power, to lower and raise the mud flaps 32. The electric motor 136 includes a pulley 140 having at least one groove to engage the cable 110 connected with the mud flaps 32 to lower and raise the mud flaps 32. An eyebolt (not shown), is mounted on the rear end 24 of the box frame 12 above the mud flap 32 to engage the cable 110 connected with the mud flap 32. In still another alternative embodiment, shown in FIG. 5, the invention includes single electric motor 136 connected to the electric wire 128 to lower and raise the mud flaps 32, disposed upon each side of the box 26.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility.

What is claimed is:

1. A box for handling materials with a vehicle comprising:
   a box frame having front and rear corners and front, rear and side walls defining a space between said front, rear and side walls with said side walls having tops and bottoms;
   a sleeve positioned at each of said rear corners and extending between said top and bottom of said adjacent side walls;
   at least one mud flap secured under said rear wall of said box frame;
   at least one lifting unit connected with said mud flap and disposed within said sleeve and connected to said mud flap for raising and lowering said mud flap;
   a noise indicator positioned in the vehicle;
   a light indicator positioned in the vehicle and connected with said power source;
   a brake pressure switch connected with said light indicator and having at least one cable extending therefrom;
   a power source positioned in the vehicle and connected with said noise indicator and said light indicator by an electric wire to supply electric power to activate said noise indicator and said light indicator; and
   a multi-mode activator adjacent said brake pressure switch for regulating air supply into respective mode of operation of said mud flaps during lifting and lowering said mud flaps.

2. A box for handling materials with a vehicle as set forth in claim 1 wherein said lifting unit comprises a tubular housing having front and rear ends and includes inlet and outlet ports.

3. A box for handling materials with a vehicle as set forth in claim 1 wherein said sleeve includes an outer wall and an inner wall defining an enclosure to house said lifting unit.

4. A box for handling materials with a vehicle as set forth in claim 1 including at least one air tank comprising at least one airline extending therefrom and connected with said multi-mode activator to supply air from said air tank to said multi-mode activator.

5. A box for handling materials with a vehicle as set forth in claim 2 including a rod defining distal and proximal ends, wherein said distal end of said rod extends outwardly from said tubular housing, said proximal end of said rod is connected to a piston disposed inside said housing.

6. A box for handling materials with a vehicle as set forth in claim 5 wherein said piston is slidably disposed within said tubular housing, said piston adjacent said rear end.

7. A box for handling materials with a vehicle as set forth in claim 6 including a cable connected with said distal end of said rod and outwardly extending therefrom wherein said cable is secured with said mud flap to lift and lower said mud flap.

8. A box for handling materials with a vehicle as set forth in claim 4 including at least one airline extending from said multi-mode activator and further extending towards the rear wall of the box frame, wherein said airlines further define outward and inward pressure airlines adjacent and are spaced from one another, said outward and inward pressure airlines defining front and rear ends, respectively.

9. A box for handling materials with a vehicle as set forth in claim 8 wherein each of said outward and inward pressure airlines comprises a coupling at said rear ends.

10. A box for handling materials with a vehicle as set forth in claim 9 including an inward pressure fitting extending from a first end of a first lifting unit to said coupling connected to said rear end of said inward pressure airline and further connecting with a first end of a second lifting unit.

11. A box for handling materials with a vehicle as set forth in claim 10 including an outward pressure fitting extending from a second end of said first lifting unit to said coupling connected to said rear end of said outward pressure airline and further connecting with a second end of said second lifting unit.

12. A box for handling materials with a vehicle as set forth in claim 10 wherein said coupling splits inward pneumatic signal between said first and second lifting units, respectively, to lift said mud flaps.

13. A box for handling materials with a vehicle as set forth in claim 11 wherein said coupling splits outward pneumatic signal between said first and second lifting units, respectively, to lower said mud flaps.

14. A box for handling materials with a vehicle as set forth in claim 13 including an electric wire outwardly extending from said brake pressure switch.

15. A box for handling materials with a vehicle comprising:
   a box frame having front and rear corners and front, rear and side walls defining a space between said front, rear and side walls, with said side walls having tops and bottoms;
   a sleeve positioned at each of said rear corners and extending between said top and bottom of said adjacent side walls;
   at least one mud flap secured under said rear wall of said box frame;
   at least one lifting unit connected with said mud flap and disposed within said sleeve and connected to said mud flap for raising and lowering said mud flap; and
   said lifting unit being disposed vertically within said sleeve and connected to said mud flap for raising and lowering said mud flap.

* * * * *